(12) United States Patent  
Rose et al.

(10) Patent No.: US 11,197,583 B2  
(45) Date of Patent: Dec. 14, 2021

(54) ROASTING RACK AND CARVING BOARD SYSTEM

(71) Applicant: Williams-Sonoma, Inc., San Francisco, CA (US)

(72) Inventors: Phillip John Patrick Rose, San Francisco, CA (US); Adam Blank, San Francisco, CA (US)

(73) Assignee: Williams-Sonoma, Inc., San Francisco, CA (US)

( * ) Notice: Subject to any disclaimer, the term of this patent is extended or adjusted under 35 U.S.C. 154(b) by 147 days.

(21) Appl. No.: 16/567,696

(22) Filed: Sep. 11, 2019

(65) Prior Publication Data

US 2020/0077842 A1 Mar. 12, 2020

Related U.S. Application Data

(60) Provisional application No. 62/729,559, filed on Sep. 11, 2018.

(51) Int. Cl.

| | |
|---|---|
| *A47J 43/18* | (2006.01) |
| *A47J 47/00* | (2006.01) |
| *A47J 45/06* | (2006.01) |
| *A47J 36/02* | (2006.01) |
| *A22C 21/00* | (2006.01) |
| *A22C 17/00* | (2006.01) |
| *A47J 37/06* | (2006.01) |

(52) U.S. Cl.

CPC ........... *A47J 43/18* (2013.01); *A22C 17/0013* (2013.01); *A22C 21/0046* (2013.01); *A47J 36/02* (2013.01); *A47J 37/0694* (2013.01); *A47J 45/06* (2013.01); *A47J 47/005* (2013.01)

(58) Field of Classification Search

CPC ...... A47J 47/005; A47J 37/0694; A47J 43/18; B23Q 3/00  
USPC ..................................................... 99/444, 445  
See application file for complete search history.

(56) References Cited

U.S. PATENT DOCUMENTS

| | | | | | |
|---|---|---|---|---|---|
| 3,106,236 | A | * | 10/1963 | Brady ................... | A47J 36/022 99/357 |
| 3,385,357 | A | * | 5/1968 | Burg ..................... | A47J 47/005 165/185 |
| 5,865,105 | A | * | 2/1999 | Pepelanov ............ | A47J 47/005 99/446 |
| 6,129,344 | A | * | 10/2000 | Yang ....................... | A47J 17/20 269/15 |
| 6,131,506 | A | * | 10/2000 | Kemper ................ | A47J 36/022 99/425 |

* cited by examiner

*Primary Examiner* — Reginald Alexander  
(74) *Attorney, Agent, or Firm* — Cook Alex Ltd.; R. Blake Johnston

(57) ABSTRACT

A roasting rack and carving board system includes a roasting rack having a number of spaced support members that support a food item. The system also includes a carving board that has a body with a cutting surface. The body and cutting surface features a number of grooves that receive the spaced support members of the roasting rack so that at least portions of some of the plurality of spaced support members are recessed into the carving board body with respect to the cutting surface.

12 Claims, 5 Drawing Sheets

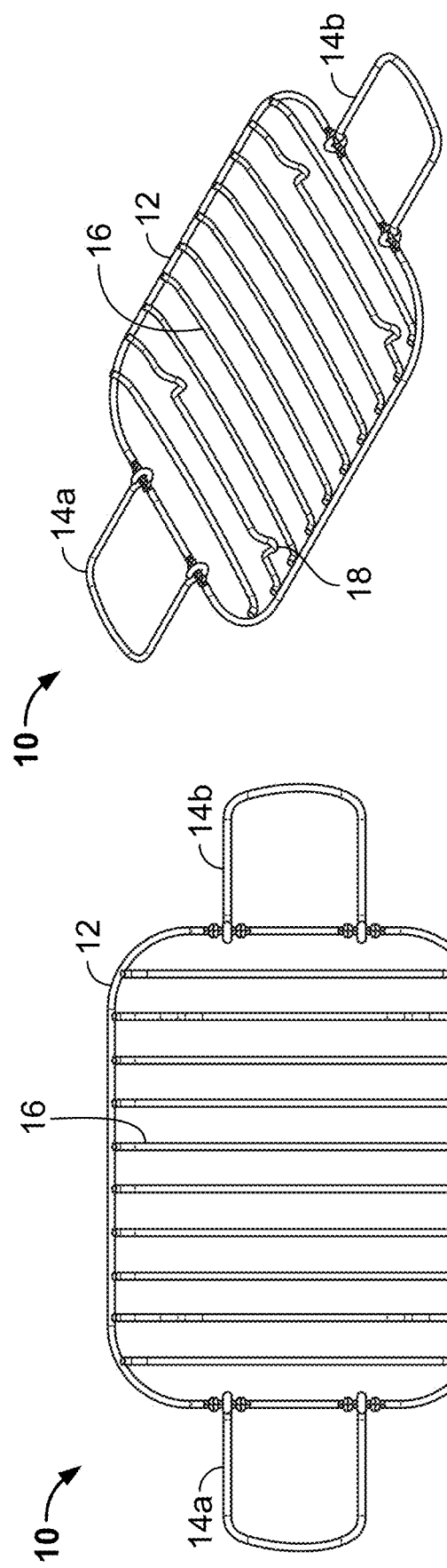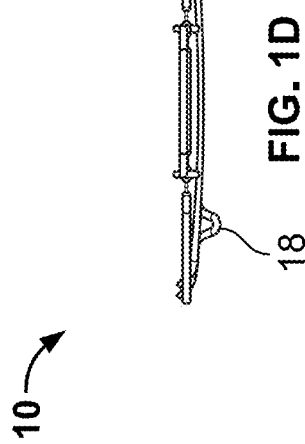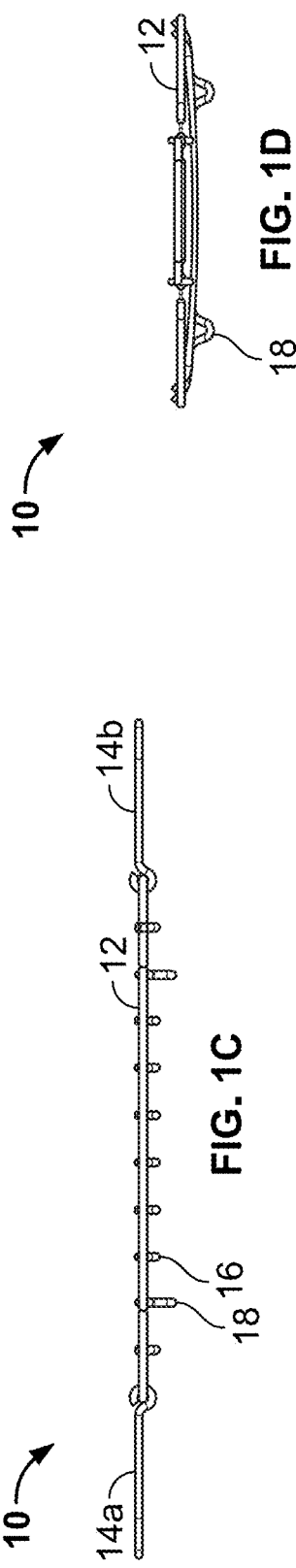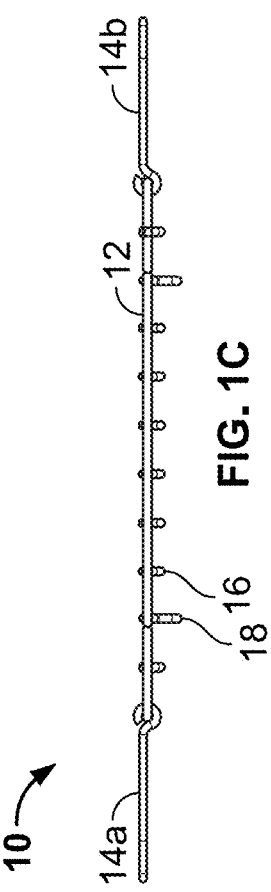

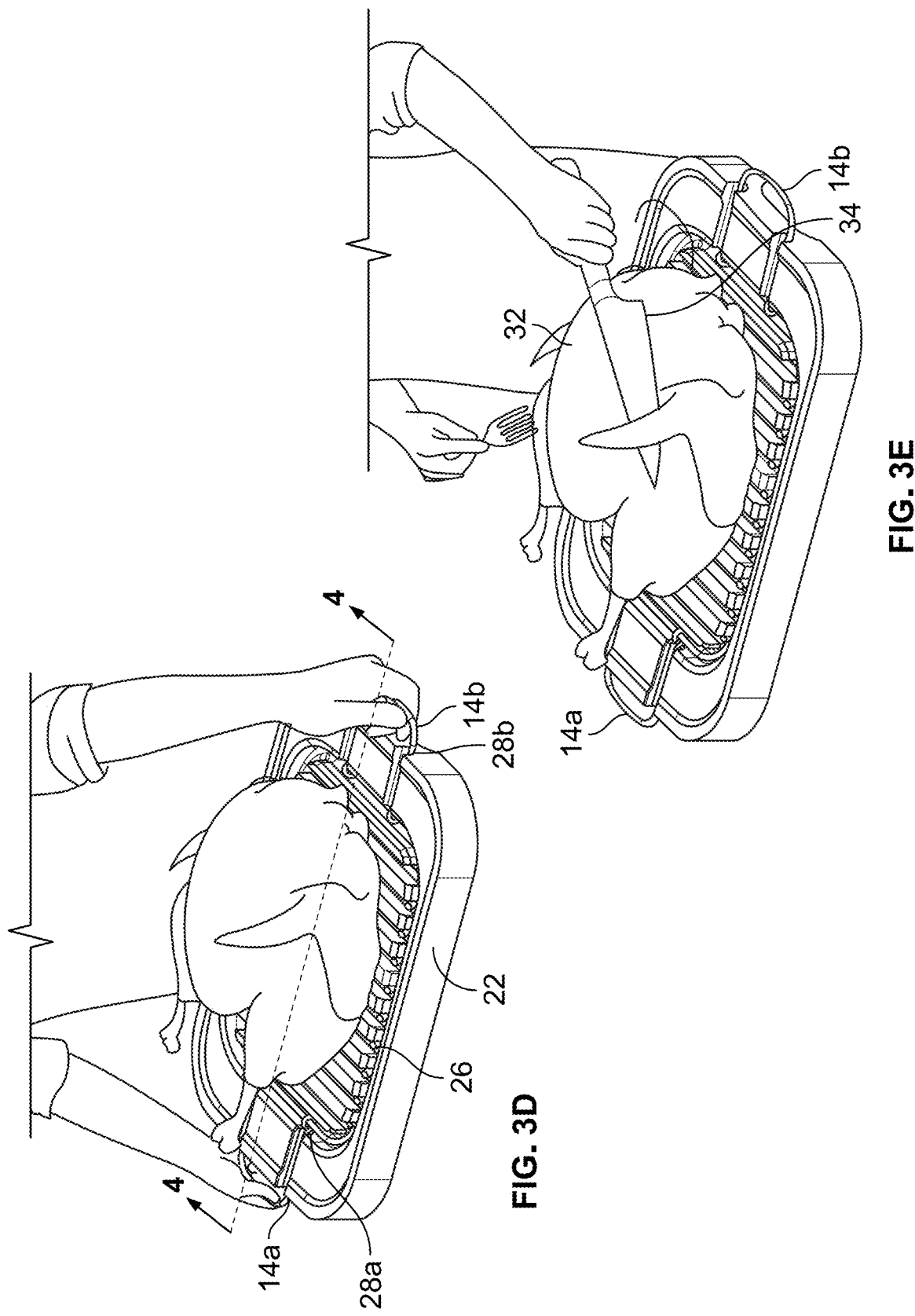

ROASTING RACK AND CARVING BOARD SYSTEM

CLAIM OF PRIORITY

This application claims priority to U.S. Provisional Patent Application No. 62/729,559, filed Sep. 11, 2018, the entire contents of which are hereby incorporated by reference.

FIELD OF THE INVENTION

The present disclosure relates generally to food preparation devices and, in particular, to a roasting rack and carving board system.

BACKGROUND

Meat in the form of roasts or poultry and the like is typically cooked in an oven or on a grill and must be carved for serving. As a result, the cooked food item is typically moved to a carving board. Transferring the food item from a roasting pan directly onto a carving board is often cumbersome and can get messy. Roasting racks that have handles and are removable from the roasting pan, so that the food item may be carried on the rack to a carving board, are known. When such racks, which are typically made of steel wire, are positioned on the carving board, however, the carving knife may contact the rack and dull and/or damage the carving knife blade cutting edge.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a roasting rack and carving board system includes a roasting rack having a number of spaced support members configured to support a food item. The system also includes a carving board having a body with a cutting surface. The body and cutting surface feature grooves configured to removably receive the spaced support members of the roasting rack so that at least portions of some of the spaced support members are recessed into the carving board body with respect to the cutting surface.

In another aspect, a method of preparing a food item includes the steps of positioning the food item on a rack including spaced support members; positioning the rack in or on a cooking device; cooking the food item using the cooking device while the food item is positioned on the rack; removing the rack with the food item positioned thereon from the cooking device; transferring the rack with the food item positioned thereon to a cutting board featuring grooves and inserting the spaced support members of the rack into the grooves of the cutting board so that the spaced support members are recessed with respect to a cutting surface of the cutting board and the food item rests on the cutting surface of the cutting board.

BRIEF DESCRIPTION OF THE DRAWINGS

FIG. 1A is a top plan view of a roasting rack in an embodiment of the disclosure;

FIG. 1B is a perspective view of the roasting rack of FIG. 1A;

FIG. 1C is a side elevational view of the roasting rack of FIGS. 1A and 1B;

FIG. 1D is an end elevational view of the roasting rack of FIGS. 1A-1C;

FIGS. 3A-3E illustrate use of an embodiment of the roasting rack and carving board system of the disclosure that includes the roasting rack of FIGS. 1A-1D and the carving board of FIGS. 2A-2D;

DETAILED DESCRIPTION OF EMBODIMENTS

An embodiment of a roasting rack of the disclosure is indicated in general at 10 in FIGS. 1A-1D. While the embodiment of the roasting rack illustrated in the figures and described below is made of stainless steel wire, alternative materials and configurations of the components may be used.

As illustrated in FIGS. 1A-1D, the rack features a peripheral member 12 upon which are pivotally positioned U-shaped handles 14a and 14b. A number of support members 16 are attached to and extend between opposing portions of the peripheral member in a spaced fashion. Feet 18 may be formed in the support members to support the rack on a surface, such as a counter or the bottom of a roasting pan. The peripheral member 12, handles 14a and 14b and support members 16 may be constructed of, as an example only, stainless steel wire.

Figure 2B:
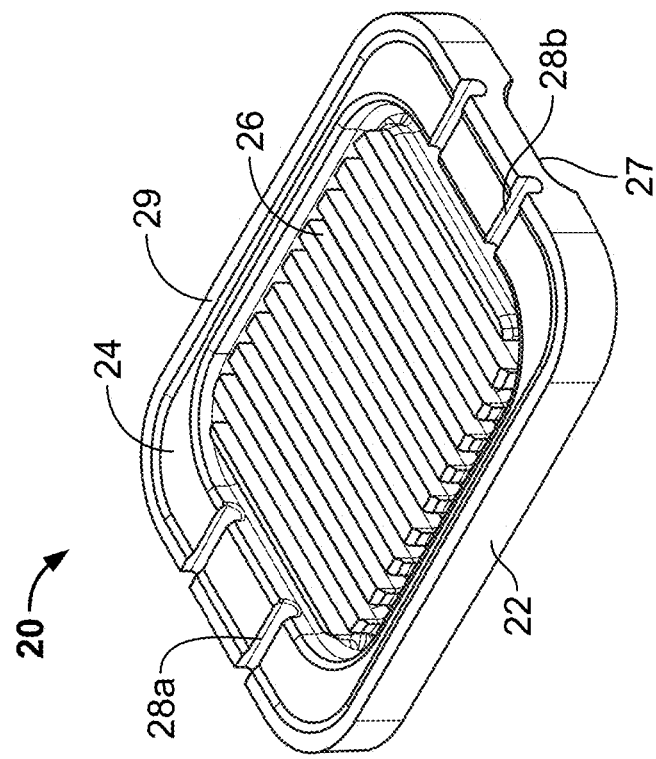
FIG. 2B is a perspective view of the carving board of FIG. 2A.
Figure 2A:
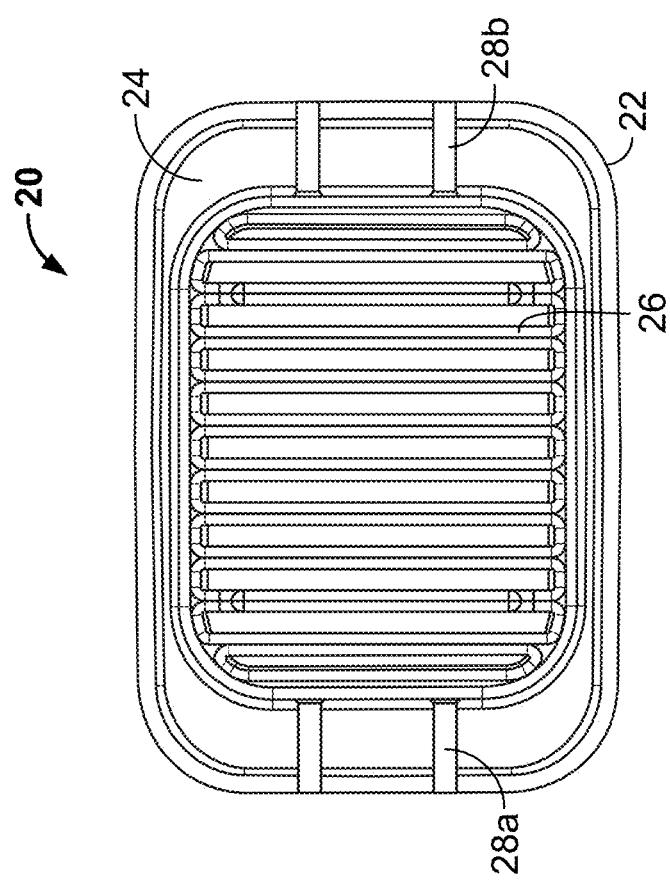
FIG. 2A is a top plan view of a carving board in an embodiment of the disclosure.
Figure 2D:
FIG. 2D is an end elevational view of the carving board of FIGS. 2A-2C.
Figure 2C:
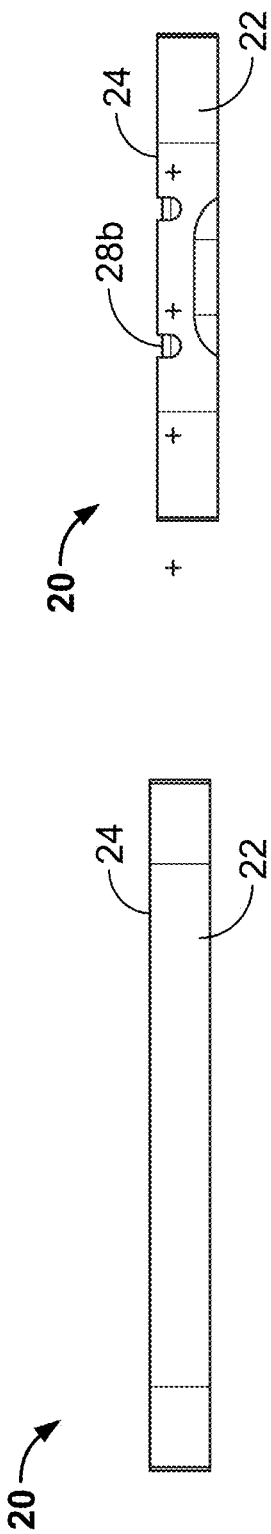
FIG. 2C is a side elevational view of the carving board of FIGS. 2A and 2B.

An embodiment of the carving board of the disclosure is indicated in general at 20 in FIGS. 2A-2D. The carving board includes a body 22 having a cutting surface 24 positioned on top. The cutting surface may be part of, and integrally formed with, the body, or it may be formed as a separate piece that is attached to the body. As best illustrated in FIG. 2B, the cutting surface and body are provided with grooves 26 that, as explained in greater detail below, receive the peripheral member 12 and spaced support members 16 of the rack of FIGS. 1A-1D. In addition, the cutting surface and body features handle recesses 28a and 28b that are configured to receive the pivoting handles 14a and 14b of the rack of FIGS. 1A-1D.

The carving board may include handle cutouts at each end, one of which is illustrated at 27 in FIG. 2B, to facilitate carrying of the carving board when food items or scraps are positioned thereon. A continuous sidewall, illustrated at 29 in FIG. 2B, may also be provided around the cutting surface 24 to prevent liquid from dripping.

The carving board, as examples only, may be constructed from wood or molded plastic.

An example of use of a roasting rack and carving board system that includes the roasting rack 10 of FIGS. 1A-1D and the carving board 20 of FIGS. 2A-2D will now be described with respect to FIGS. 3A-3E and FIGS. 4A-4C.

Figure 3A:
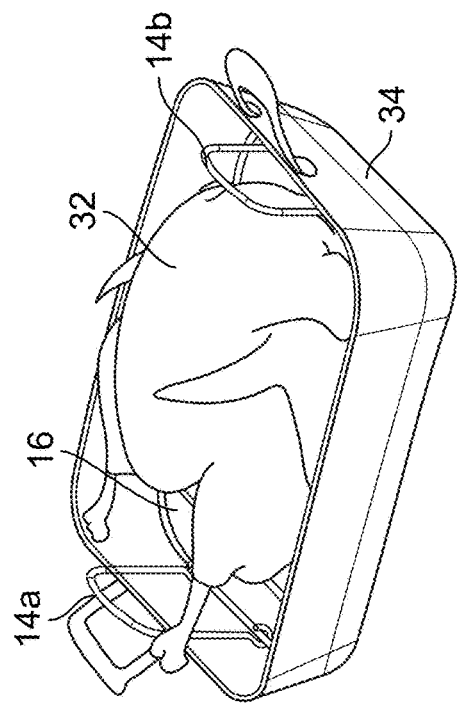

As illustrated in FIG. 3A, a food item 32, illustrated as a turkey or chicken as an example, is positioned on the support members 16 of the roasting rack, which is positioned within a roasting pan 34. The food item is roasted in an oven.

Figure 3B:
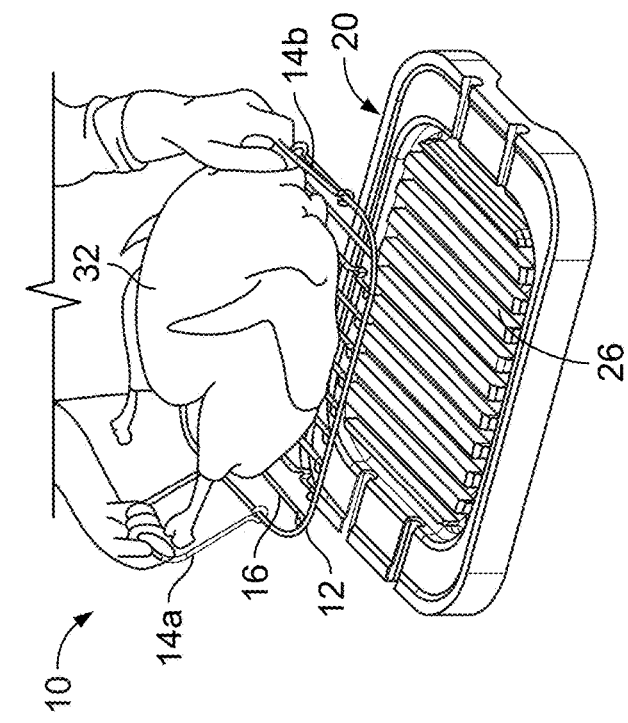

When roasting is completed, a user grasps the handles 14a and 14b of the roasting rack, lifts the rack out of the roasting pan 34 and carries the food item on the rack to the carving board 20, as illustrated in FIG. 3B.

Figure 3C:
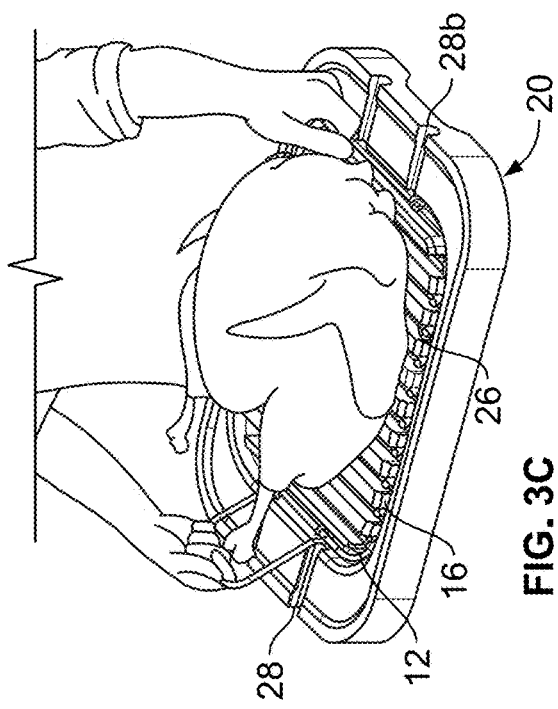
Figure 4A:
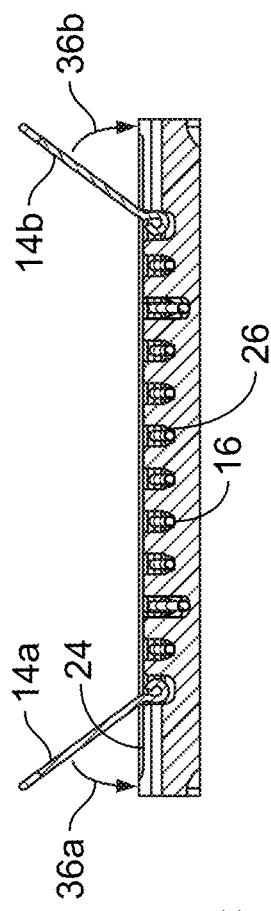
FIGS. 4A-4C are cross sectional views corresponding to FIGS. 3B-3D taken along line 4-4 of FIG. 3D.

As illustrated in FIG. 3C, the user then lowers the roasting rack that holds the meat so that the rack peripheral member 12 and support members 16 enter the grooves 26 of the carving board. The grooves 26 of the carving board are preferably sized so that the support members 16 and peripheral member 12 of the rack are recessed within the carving board so as to be below the cutting surface 24 of the carving board. This is also shown in FIGS. 4A and 4B.

Figure 4B:
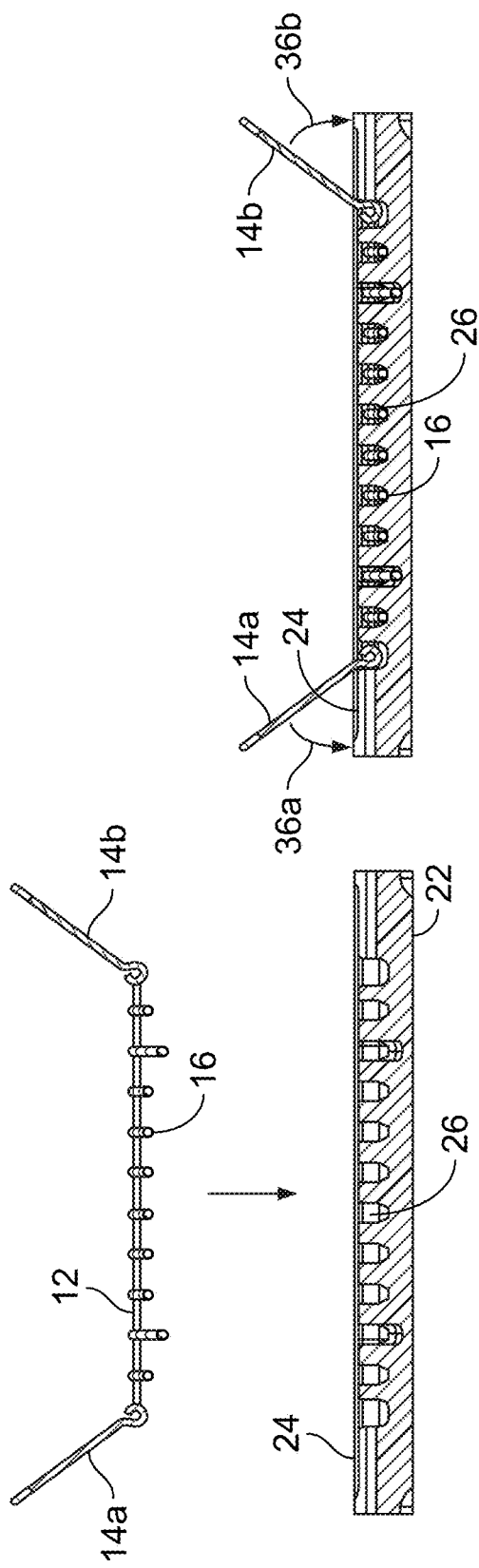
Figure 4C:
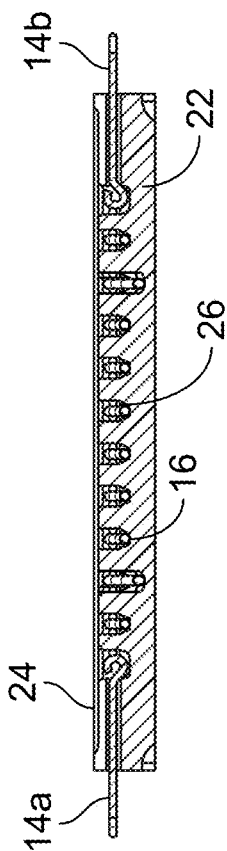

Next, as illustrated in FIGS. 3D and 4B, the handles 14a and 14b are pivoted from a carrying position, illustrated in FIGS. 3B, 3C, 4A and 4B, down into a carving position, illustrated in FIGS. 3D, 3E and 4C, where they enter the handle recesses 28a and 28b of the carving board. This pivoting is illustrated by arrows 36a and 36b of FIG. 4B. As a result, only the meat sits on top of the cutting surface of the cutting board, so that when the user carves the food item 32, as illustrated in FIG. 3E, the cutting edge 42 of the knife is not dulled or damaged. Furthermore, as a result, the meat is first roasted on the rack and then elevated when resting on the board. In addition to receiving the wires 12 and 16 of the roasting rack, the grooves 26 allow drippings to drain away, keeping the skin of the food item crisp. In an alternative embodiment, dedicated indents formed in the cutting surface (that do not receive the wire support members of the rack) may be provided to receive drippings.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A roasting rack and carving board system comprising:
   a. a roasting rack including a plurality of spaced support members configured to support a food item and a handle that pivots between a carrying position and a carving position;
   b. a carving board having a body with a cutting surface, said body and cutting surface featuring a plurality of grooves configured to removably receive the plurality of spaced support members of the roasting rack so that at least portions of some of the plurality of spaced support members are recessed into the carving board body with respect to the cutting surface and a handle recess configured to receive the handle when the handle is in the carving position.

2. The system of claim 1 wherein the roasting rack includes a peripheral member to which the plurality of spaced support members are attached and the handle features a U-shape with ends pivotally attached to the peripheral member.

3. The system of claim 2 wherein the peripheral member, the plurality of spaced support members and the handle are constructed from wire.

4. The system of claim 1 wherein the rack is constructed from wire.

5. The system of claim 4 wherein the rack is constructed from wood.

6. The system of claim 4 wherein the wire is constructed from steel.

7. The system of claim 4 wherein the spaced support members are parallel wires.

8. The system of claim 1 wherein the carving board further includes a wall generally surrounding the cutting surface.

9. A roasting rack and carving board system comprising:
   a. a roasting rack including a plurality of spaced support members configured to support a food item and a pair of handles that pivot between carrying positions and carving positions;
   b. a carving board having a body with a cutting surface, said body and cutting surface featuring a plurality of grooves configured to removably receive the plurality of spaced support members of the roasting rack so that at least portions of some of the plurality of spaced support members are recessed into the carving board body with respect to the cutting surface and a pair of handle recesses configured to receive the pair of handles when the pair of handles are in the carving position.

10. The system of claim 9 wherein the roasting rack includes a peripheral member to which the plurality of spaced support members are attached and each of the pair of handles features a U-shape with ends pivotally attached to the peripheral member.

11. The system of claim 10 wherein the peripheral member, the plurality of spaced support members and the pair of handles are constructed from wire.

12. The system of claim 9 wherein the pair of handles are configured to fit within a roasting pan when in the carrying positions.

* * * * *